United States Patent Office 3,402,198
Patented Sept. 17, 1968

3,402,198
2-(PHENOXY), 2-(PHENYLTHIO) AND 2-(ANILINO) SUBSTITUTED 2 - ALKYLIDENEACETIC ACID DERIVATIVES
William A. Bolhofer, Frederick, Montgomery County, Pa. 19435
No Drawing. Filed Oct. 20, 1965, Ser. No. 499,009
9 Claims. (Cl. 260—519)

ABSTRACT OF THE DISCLOSURE

This invention relates to 2-(phenoxy), 2-(phenylthio) and 2-(anilino) substituted 2-alkylideneacetic acids and to the salts, esters and amide derivatives thereof. The products are cholesterol and triglyceride lowering agents which have application in the treatment of atherosclerosis.

The products are obtained by treating a phenol, thiophenol or aniline with an ester of a 2-halo-2-alkylideneacetic acid in the presence of a base followed by the hydrolysis of the resulting ester intermediate thus formed to the desired carboxylic acid.

---

This invention relates to a new class of chemical compounds which can be described generally as 2-(phenoxy), 2-(phenylthio) and 2-(anilino) substituted 2-alkylideneacetic acids and to the nontoxic, pharmacologically acceptable salts, esters and amide derivatives thereof.

Also, it is an object of this invention to describe a novel method of preparation for the foregoing 2-(phenoxy), 2-(phenylthio) and 2-(anilino) substituted 2-alkylideneacetic acids and their ester and amide derivatives.

Clinical studies show that cholesterol apparently plays a major role in the formation of atherosclerotic plaques by accelerating the deposition of blood lipids in the arterial wall. It is the purpose of this invention to disclose a new class of chemical compounds which effectively reduces the concentration of cholesterol and other lipids in blood serum and thus ameliorates the condition usually associated with blood lipid deposition.

The 2-(phenoxy), 2-(phenylthio) and 2-(anilino) substituted 2-alkylideneacetic acids of the invention are products having the following general formula:

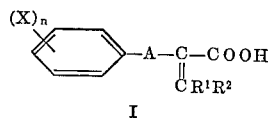

I wherein A is a member selected from the group consisting of oxygen, sulfur, imino and N-alkylimino; $R^1$ and $R^2$ are similar or dissimilar members selected from the group consisting of hydrogen and alkyl; the X radicals are similar or dissimilar substituents selected from the group consisting of halogen, alkenyl, haloalkyl, perhaloalkyl, for example, trihalomethyl and trihalomethyl substituted lower alkyl such as trifluoromethyl, 2,2,2-trifluoroethyl, etc., hydroxyalkyl, alkoxy, alkylthio, alkylsulfonyl, alkanoyl, cycloalkyl, for example, a lower cycloalkyl radical containing from five to six nuclear carbon atoms, amino, alkylamino, dialkylamino, and lower alkanamido and $n$ is an integer having a value of one to five.

A preferred embodiment of the invention relates to the mononuclear substituted 2-(phenoxy)-2-alkylideneacetic acids having the following structural formula:

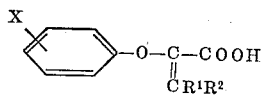

wherein $R^1$ and $R^2$ are as defined above and X is halogen. The foregoing class of compounds exhibits particularly good hypocholesterolemic activity and thus represents a preferred subgroup of compounds within the scope of this invention.

The products of the invention are conveniently prepared by an etherification reaction which comprises treating an ester of a 2-halo-2-alkylideneacetic acid (II, infra) with a suitable nuclear substituted phenol, thiophenol or aniline in the presence of a base, such as anhydrous sodium carbonate, anhydrous potassium carbonate, etc., to obtain the corresponding 2-(phenoxy), 2-(phenylthio) or 2-(anilino) substituted 2-alkylideneacetic acid ester (III, infra); the ester product thus obtained may then be isolated and purified or, if desired, the said 2-(phenoxy), 2-(phenylthio) or 2-(anilino) substituted 2-alkylideneacetic acid ester (III) may be hydrolyzed in the presence of a basic reagent to obtain the corresponding acid product (I). Suitable bases which may be used in the hydrolysis step include aqueous solutions of alkali metal hydroxides, carbonates, etc., such as potassium hydroxide, potassium carbonate, sodium carbonate, etc. The following equation illustrates the reaction:

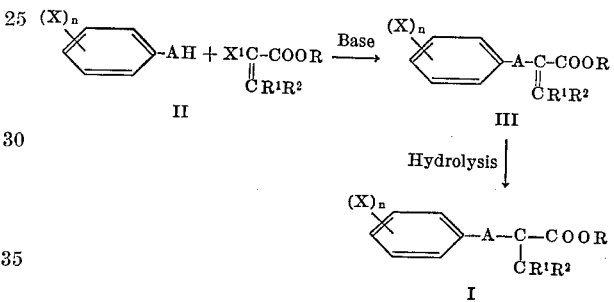

wherein A, $R^1$, $R^2$, X and $n$ are as defined above; R is an hydrocarbyl radical, i.e., an organic radical composed solely of carbon and hydrogen such as alkyl, etc. and $X^1$ is halogen, for example, chlorine, bromine, etc.

The application of heat and the choice of a solvent are not critical to the success of the process but, in general, the etherification reaction proceeds most advantageously with the application of slight heating and in the presence of a suitable reaction medium such as dimethylformamide.

The 2-halo-2-alkylideneacetic acid esters (II) employed as starting materials in the etherification process, supra, are prepared from their corresponding 2,3-dihaloalkanoic acid ester precursors by treating the latter with a suitable dehydrohalogenating agent such as quinoline, pyridine, lutidine, a tertiary alkylamine, anhydrous lithium chloride, etc. The application of heat is not critical to the success of the reaction but it has been found that the process does proceed most advantageously with the use of heat as, for example, by heating at reflux temperatures. The following equation illustrates the reaction:

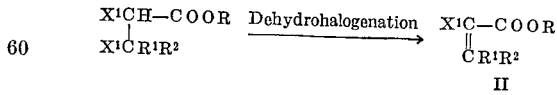

wherein R, $R^1$, $R^2$ and $X^1$ are as defined above.

The 2-(phenoxy), 2-(phenylthio) and 2-(anilino) substituted 2-alkylideneacetic acid products (I) of the invention are generally obtained as crystalline solids and, if desired, may be purified by recrystallization from a suitable solvent. Suitable solvents include, for example, hexane, cyclohexane, etc.

Included within the scope of this invention are the nontoxic, pharmacologically acceptable acid addition salts of the instant products (I). In general, any base which will form an acid addition salt with the foregoing 2-(phenoxy), 2-(phenylthio) and 2-(anilino) substituted 2-alkylideneacetic acids (I) and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines such as monoalkylamines, dialkylamines, trialkylamines, nitrogen containing heterocyclic amines, for example, piperidine, etc.

Also included within the scope of this invention are the ester and amide derivatives of the instant 2-(phenoxy), 2-(phenylthio) and 2-(anilino) substituted 2-alkylideneacetic acids (I), which may be prepared by several methods. According to one method the amide derivatives are prepared by converting a 2-(phenoxy), 2-(phenylthio) or 2-(anilino) substituted 2-alkylideneacetic acid to the corresponding acid halide in a conventional manner and treating the said acid halide with ammonia or an appropriate amine to obtain the desired amide. Another method of preparation consists in the reaction of a 2-(phenoxy), 2-(phenylthio) or 2-(anilino) substituted 2-alkylideneacetic acid with dicyclohexylcarbodiimide, N-ethyl-5-phenylisoxazolium-3'-sulfonate, 1,1'-carbonyldiimidazole, 1,1'-thionyldiimidazole, etc. and treating the intermediate thus formed with ammonia or a suitable amine to form the corresponding amide product.

The ester derivatives of the 2-(phenoxy), 2-(phenylthio) and 2-(anilino) substituted 2-alkylideneacetic acids (I) can either be prepared inherently according to the process hereinabove disclosed for the preparation of the instant products (i.e., by treating an ester of a 2-halo-2-alkylideneacetic acid with a suitable phenol, thiophenol or aniline in the presence of a base and isolating the ester intermediate (III) thus formed) or, alternatively, the said esters may be prepared by any one of several methods known to those skilled in the art. According to one such method the ester derivatives are prepared by the reaction of a 2-(phenoxy), 2-(phenylthio) or 2-(anilino) substituted 2-alkylideneacetic acid (I) with an alcohol as, for example, with a lower alkanol, a di-lower alkylamino substituted alkanol such as dimethylaminoethanol or with an heterocyclic substituted lower alkanol such as 3-hydroxymethylpyridine, etc. Still another method of preparation for the ester derivatives consists in converting a 2-(phenoxy), 2-(phenylthio) or 2-(anilino) substituted 2-alkylideneacetic acid to the corresponding acid halide by conventional methods and treating the acid halide thus formed with the appropriate lower alkanol, di-lower alkylamino alkanol, 3-hydroxymethylpyridine, etc.

The foregoing methods for the preparation of the salts, esters and amide derivatives of the instant products (I) will be apparent to those having ordinary skill in the art and, to the extent that the said derivatives are both non-toxic and physiologically acceptable to the body system, the said esters and amides are the functional equivalent of the corresponding 2-(phenoxy), 2-(phenylthio) and 2-(anilino) substituted 2-alkylideneacetic acid products (I).

There is no clear agreement about the actual role of cholesterol synthesis in the localization of atherosclerotic plaques but numerous studies support the concept that cholesterol plays a major role in the pathogenesis of atherosclerosis because along with other lipids and fibrin it is the substance that accumulates in the arterial intima and subintima and produces arterial corrosion.

Since cholesterol is present to some extent in all ordinary diets and since it is also synthesized by various body organs from intermediates of metabolic orgin, the development of some chemotherapeutic agent which will induce a significant reduction in the serum cholesterol level has been found desirable. In a search for such chemotherapeutic agents the products of the invention have been found to exhibit surprisingly good hypocholesterolemic activity and may be administered alone or in combination with other chemotherapeutic agents in dosage unit form and in admixture with a pharmaceutical carrier.

The following examples are illustrative of the products of the invention and the method by which they may be prepared. The examples are illustrative only and the invention should not be construed as being limited thereto.

Example 1.—2-(4-chlorophenoxy)acrylic acid

Step A: Methyl 2-(4-chlorophenoxy)acrylate.—A mixture of methyl 2-bromoacrylate (41.5 g.; 0.25 mole), 4-chlorophenol (31.0 g.; 0.24 mole) anhydrous potassium carbonate (35 g.; 0.25 mole) and dimethylformamide (100 ml.) is stirred and heated at 55–60° C. for five hours. Upon pouring into water an oil separates. The oil is extracted with ether, the ether extract washed with a cold 2.5% sodium hydroxide solution and then with water and dried over magnesium sulfate. After evaporation of the ether a viscous oil remains which is distilled (B.P. 100–110° C./0.5 mm.) to obtain 12.2 g. of methyl 2-(4-chlorophenoxy)acrylate.

Step B: 2-(4-chlorophenoxy)acrylic acid.—The 12.2 g. of methyl 2-(4-chlorophenoxy)acrylate from Step A is added to a solution of 6.1 g. of potassium hydroxide in 50 ml. of methyl alcohol. The solution is boiled for 10 minutes then cooled and diluted with 200 ml. of water. On acidification an oil separates which is extracted with ether. The ether extract is washed with water and dried over magnesium sulfate. Evaporation of the ether leaves an oily, solid residue which is crystallized from hexane. There is thus obtained 2.0 g. of 2-(4-chlorophenoxy)acrylic acid which melts at 81–83° C.

Analysis for $C_9H_7ClO_3$.—Calculated: C, 54.43; H, 3.55; Cl, 17.85. Found: C, 54.51; H, 3.57; Cl, 17.90.

Example 2.—2-(4-chlorophenoxy)crotonic acid

Step A: Methyl 2-bromocrotonate.—A mixture of methyl 2,3-dibromobutyrate (65 g.; 0.25 mole) and quinoline (32.2 g.; 0.25 mole) is distilled at 25 mm. pressure. The total distillate (41.6 g.) is then fractionally distilled at 25 mm. to obtain 37 g. (82% yield) of methyl 2-bromocrotonate, B.P. 81–82° C.

Step B: Methyl 2-(4-chlorophenoxy)crotonate.—Methyl 2-bromocrotonate (37 g.; 0.206 mole) is added dropwise to a boiling, stirred mixture of 4-chlorophenol (27 g.; 0.206 mole) and anhydrous potassium carbonate (33 g.; 0.24 mole) in acetone (290 ml.). The resulting mixture then is refluxed for 10.5 hours after which the acetone is evaporated under reduced pressure. Water (100 ml.) is added to the residue and the insoluble oily product is extracted with ether. The extract is dried and the ether evaporated to yield a residual oil which is then distilled at a pressure of 0.2 mm. Methyl 2-(4-chlorophenoxy)crotonate (26.0 g.; 77% yield) is collected at its boiling point of 88–91° C.

Step C: 2-(4-chlorophenoxy)crotonic acid.—Methyl 2-(4-chlorophenoxy)crotonate (37 g.; 0.164 mole) is added to a solution of potassium hydroxide (13.3 g.; 0.238 mole) in water (155 ml.) and methanol (67 ml.) The mixture is stirred and heated at 80–90° C. for 10 minutes. The homogeneous mixture then is cooled to 20° C. and acidified with concentrated hydrochloric acid. The colorless solid that separates is collected by filtration, dried in air at 65° C. and crystallized twice from hexane to obtain 22 g. of 2-(4-chlorophenoxy)crotonic acid, M.P. 128.5–129.5° C.

Analysis for $C_{10}H_9ClO_3$.—Calculated: C, 56.49; H, 4.27; Cl, 16.68. Found: C, 56.57; H, 4.14; Cl, 16.54.

Example 3.—2-(4-chlorophenoxy)-3-methylcrotonic acid

Step A: Methyl 2-(4-chlorophenoxy)-3-methylcrotonate.—A mixture of potassium carbonate (22 g.; 16 mole), 4-chlorophenol (18 g.; 0.14 mole) and methyl 2-bromo-3-methylcrotonate (27 g.; 0.14 mole) in acetone (200 ml.) is heated under reflux for 12 hours with stirring. The acetone then is distilled and 200 ml. of water is added. The oily product thus formed is extracted with ether and the extract dried over sodium sulfate. The residue then is distilled to obtain 26.0 g. (77% yield) of methyl 2-(4-chlorophenoxy)-3-methylcrotonate which boils at 88–91° C. and 0.2 mm. pressure.

Step B: 2-(4-chlorophenoxy)-3-methylcrotonic acid.—Methyl 2-(4-chlorophenoxy)-3-methylcrotonate (26 g.; 0.11 mole) is added to a solution of potassium hydroxide (9.0 g.; 0.16 mole) in methanol (45 ml.) and water (105 ml.). The mixture is refluxed for 20 minutes during which time the original oily material dissolves. The mixture is acidified with concentrated hydrochloric acid and the solid that separates is collected by filtration. The solid is dissolved in dilute sodium bicarbonate and the solution filtered and acidified. The solid that separates is collected, dried in air at 65° C. and twice recrystallized from cyclohexane to give 16.1 g. of 2-(4-chlorophenoxy)-3-methylcrotonic acid, M.P. 147–148° C.

Analysis for $C_{11}H_{11}ClO_3$.—Calculated: C, 58.27; H, 4.89; Cl, 15.64. Found: C, 58.78; H, 5.22; Cl, 15.68.

In a manner similar to that described in Example 1, Steps A and B, for the preparation of 2-(4-chlorophenoxy)acrylic acid, all of the 2-(phenoxy), 2-(phenylthio) and 2-(anilino) substituted 2-alkylideneacetic acid products (I) of the invention may be obtained. Thus, by substituting the appropriate alkyl 2-halo-2-alkylideneacetate and phenol, thiophenol or aniline for the methyl 2-bromoacrylate and 4-chlorophenol recited in Example 1, Step A and following substantially the procedure described in Steps A and B of that example the corresponding 2-(phenoxy), 2-(phenylthio) and 2-(anilino) substituted 2-alkylideneacetic acid products (I) may be obtained. The following equation, wherein the base employed is anhydrous potassium carbonate, illustrates the reaction of Example 1, Steps A and B and, together with Table 1, depict the alkyl 2-halo-2-alkylideneacetate and phenol, thiophenol and aniline starting materials of the process and the corresponding products (I) produced thereby:

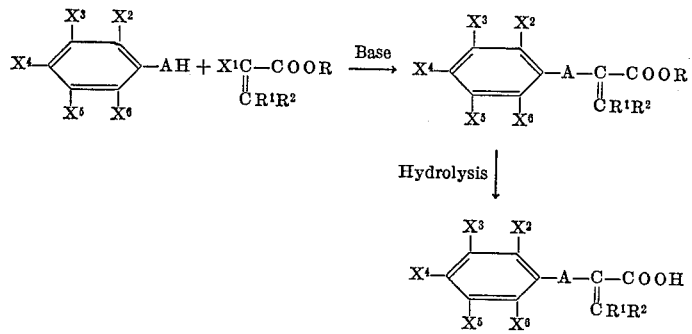

TABLE I

| Ex. | R | R¹ | R² | X¹ | X² | X³ | X⁴ | X⁵ | X⁶ | A |
|---|---|---|---|---|---|---|---|---|---|---|
| 4 | —CH₃ | H | H | Br | H | H | —CHO | H | H | S |
| 5 | —CH₃ | —CH₃ | —CH₃ | Br | H | —CH₂OH | H | H | H | O |
| 6 | —CH₃ | —CH₃ | —CH₃ | Cl | —CHO | H | H | H | H | S |
| 7 | —C₂H₅ | H | —CH₃ | Cl | H | —NH₂ | H | H | H | O |
| 8 | —(CH₂)₂CH₃ | H | H | Br | —SO₂CH₃ | —CF₃ | H | H | H | O |
| 9 | —CH₃ | —CH₃ | —CH₃ | Cl | H | H | H | H | H | O |
| 10 | —CH₃ | —CH₃ | —CH₃ | Br | H | Br | H | Br | H | O |
| 11 | —CH₃ | H | —CH₃ | Br | H | H | —SO₂CH₃ | H | H | —NH— |
| 12 | —C₂H₅ | H | —CH₃ | Cl | H | H | —CH₂Cl | H | H | O |
| 13 | —(CH₂)₂CH₃ | H | H | Cl | —CH₂CH=CH₂ | H | H | H | H | O |
| 14 | —(CH₂)₃CH₃ | H | H | Cl | H | H | —SCH₃ | H | I | O |
| 15 | —CH₃ | —CH₃ | —CH₃ | Br | Br | H | —⟨H⟩ | H | H | O |
| 16 | —CH₃ | H | —CH₃ | Br | —OCH₃ | H | Br | H | —OCH₃ | O |
| 17 | —C₂H₅ | H | —CH₃ | Cl | H | H | —NHCH(C₂H₅)(CH₃) | H | H | O |
| 18 | —(CH₂)₂CH₃ | H | —CH₃ | Cl | H | H | —COCH₂CH₃ | H | H | O |
| 19 | —CH₃ | H | —CH₃ | Br | H | F | H | H | H | —NC₂H₅— |
| 20 | —C₂H₅ | H | H | Cl | H | H | —NHC₂H₅ | H | H | O |
| 21 | —CH₃ | —CH₃ | —CH₃ | Cl | Br | H | Br | H | H | O |
| 22 | —CH₃ | H | —CH₃ | Br | Br | H | I | H | Br | O |
| 23 | —C₂H₅ | H | —CH₃ | Br | H | H | —N(C₂H₅)₂ | H | H | O |
| 24 | —CH₃ | —CH₃ | —CH₃ | Br | —OCH₃ | H | H | H | —OCH₃ | O |
| 25 | —CH₃ | H | —CH₃ | Cl | —OC₂H₅ | H | H | H | H | O |
| 26 | —C₂H₅ | H | H | Cl | —COCH₂CH₃ | H | —COCH₂CH₃ | —OCH₃ | H | O |
| 27 | —CH₃ | —CH₃ | —CH₃ | Br | Cl | Cl | Cl | H | H | O |
| 28 | —(CH₂)₂CH₃ | H | H | Br | —OCH₃ | H | H | —OCH₃ | Cl | O |
| 29 | —CH₃ | H | —CH₃ | Cl | H | H | —NHCOCH₃ | H | H | O |
| 30 | —(CH₂)₃CH₃ | —CH₃ | —CH₃ | Br | H | H | —S(CH₂)₃CH₃ | H | H | O |
| 31 | —CH₃ | —CH₃ | —CH₃ | Br | H | H | —⟨H⟩ | H | H | O |
| 32 | —(CH₂)₄CH₃ | H | H | Br | F | F | F | F | F | O |
| 33 | —CH₃ | —CH₃ | —CH₃ | Cl | H | —CH₂CF₃ | H | H | H | O |
| 34 | —CH₃ | H | H | Br | H | —N(CH₃)₂ | H | H | H | O |
| 35 | —C₂H₅ | H | H | Cl | H | Cl | H | H | H | —NCH₃— |
| 36 | —CH₃ | —CH₃ | —CH₃ | Br | —⟨H⟩ | H | Cl | —OC₂H₅ | H | O |

The products of the invention can be administered in a wide variety of theropeutic dosages in conventional vehicles as, for example, by oral administration in the form of a tablet as well as by intravenous injection. Also, the dosage of the products may be varied over a wide range as, for example, in the form of scored tablets containing 5, 10, 25, 50, 100, 150, 250 and 500 milligrams of the active ingredient for the symptomatic adjustment of the dosage to the patient to be treated. These dosages are well below the toxic or lethal dose of the products.

A suitable unit dosage form of the products of this invention can be administered by mixing 20 milligrams of a 2-(phenoxy), 2-(phenylthio) or 2-(anilino) substituted 2-alkylideneacetic acid (I) or a suitable acid addition salt, ester or amide derivative thereof, with 174 milligrams of lactose and 6 milligrams of magnesium stearate and placing the 200 milligram mixture into a No. 1 gelatin capsule. Similarly, by employing more of the active ingredient and less lactose, other dosage forms can be put up in No. 1 gelatin capsules and, should it be necessary to mix more than 200 milligrams of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is included to illustrate the preparation of a representative dosage form:

Example 37.—Dry-filled capsules containing 20 mg. of active ingredient per capsule

| | per capsule, mg. |
|---|---|
| 2-(4-chlorophenoxy)-3-methylcrotonic acid | 20 |
| Lactose | 174 |
| Magnesium stearate | 6 |
| Capsule size No. 1 | 200 |

Similar dry-filled capsules can be prepared by replacing the active ingredient of the above example by any of the other novel compounds of this invention.

It will be apparent from the foregoing description that the 2-(phenoxy), 2-(phenylthio) and 2-(anilino) substituted 2-alkylideneacetic acids (I) of this invention constitute a valuable class of compounds which have not been prepared heretofore. One skilled in the art will also appreciate that the process disclosed in the above examples is merely illustrative and is capable of wide variation and modification without departing from the spirit of this invention.

What is claimed is:

1. A member selected from the group consisting of a compound having the formula:

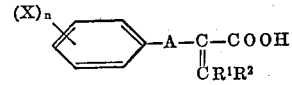

wherein A is a member selected from the group consisting of oxygen, sulfur, imino and N-alkylimino; $R^1$ and $R^2$ are similar or dissimilar members selected from the group consisting of hydrogen and lower alkyl; the X radicals are similar or dissimilar substituents selected from the group consisting of halogen, alkenyl, monohalo substituted lower alkyl, perhaloalkyl, hydroxyalkyl, alkoxy, alkylthio, alkylsulfonyl, alkanoyl, cycloalkyl, amino, alkylamino, dialkylamino and lower alkanamido and $n$ is an integer having a value of one to five; and the non-toxic, pharmacologically acceptable salts, lower alkyl esters, di-lower alkylamino lower alkyl esters, 3-pyridylmethyl esters and amide derivatives thereof.

2. A compound having the formula:

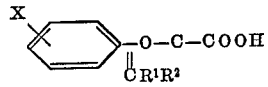

wherein $R^1$ and $R^2$ are similar or dissimilar members selected from the group consisting of hydrogen and lower alkyl and X is halogen.

3. 2-(4-chlorophenoxy)acrylic acid.
4. 2-(4-chlorophenoxy)crotonic acid.
5. 2-(4-chlorophenoxy)-3-methylcrotonic acid.
6. 2-(3 - trifluoromethylphenoxy) - 3 - methylcrotonic acid.
7. 2-(4-diethylaminophenoxy)crotonic acid.
8. 2-(2,6-dimethoxyphenoxy)-3-methylcrotonic acid.
9. 2-(4-cyclohexylphenoxy)-3-methylcrotonic acid.

References Cited

Morrison et al.: Organic Chemistry (1959), pub. by Allyn and Bacon, Inc., p. 593 relied on.

LORRAINE A. WEINBERBER, Primary Examiner.

L. A. THAXTON, Assistant Examiner.